United States Patent [19]

Yoshida

[11] Patent Number: 4,484,240
[45] Date of Patent: Nov. 20, 1984

[54] CASSETTE LOADING APPARATUS

[75] Inventor: Shuji Yoshida, Warabi, Japan

[73] Assignee: Sony Corporation, Tokyo, Japan

[21] Appl. No.: 347,786

[22] Filed: Feb. 11, 1982

[30] Foreign Application Priority Data

Feb. 14, 1981 [JP] Japan .............................. 56-20390

[51] Int. Cl.³ .............................................. G11B 15/66
[52] U.S. Cl. ................................................... 360/96.5
[58] Field of Search ............................... 360/96.5, 96.6

[56] References Cited

U.S. PATENT DOCUMENTS 4,031,557 6/1977 Ban et al. ........................... 360/96.6
4,379,314 4/1983 Kamimura et al. ................ 360/96.5

*Primary Examiner*—Robert S. Tupper
*Attorney, Agent, or Firm*—Lewis H. Eslinger; Alvin Sinderbrand

[57] ABSTRACT

A cassette loading apparatus, for example, for a video tape recording and/or reproducing apparatus (VTR), and having a cassette holder movable between a raised, cassette-receiving position in which a cassette can be slidably inserted therein, and a lowered or cassette-loading position in which the cassette contained in the holder is intended to be engaged, from above, with reel mounts and cassette positioning pins, is provided with a device for preventing movement of the cassette holder from the cassette-receiving position toward the cassette-loading position in the event that a cassette is not fully or accurately inserted in the holder, whereby to avoid damage to the cassette or to the reel mounts and cassette positioning pins that might result from the movement of the holder to its loading position with an incompletely inserted cassette therein.

14 Claims, 21 Drawing Figures

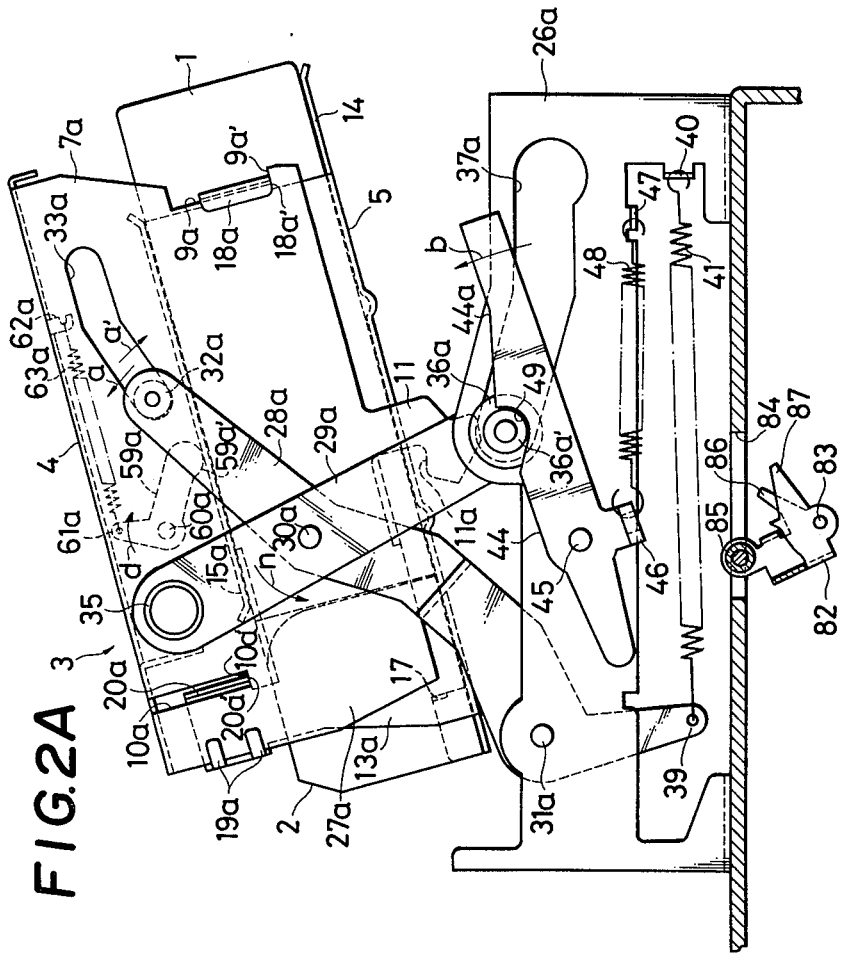

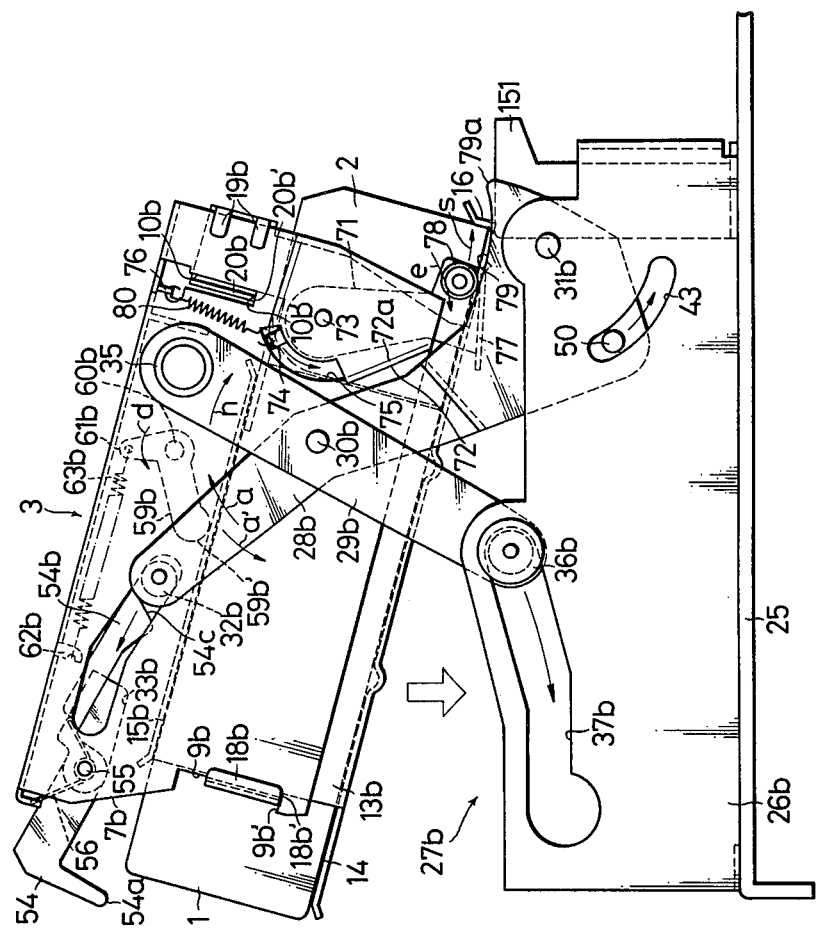

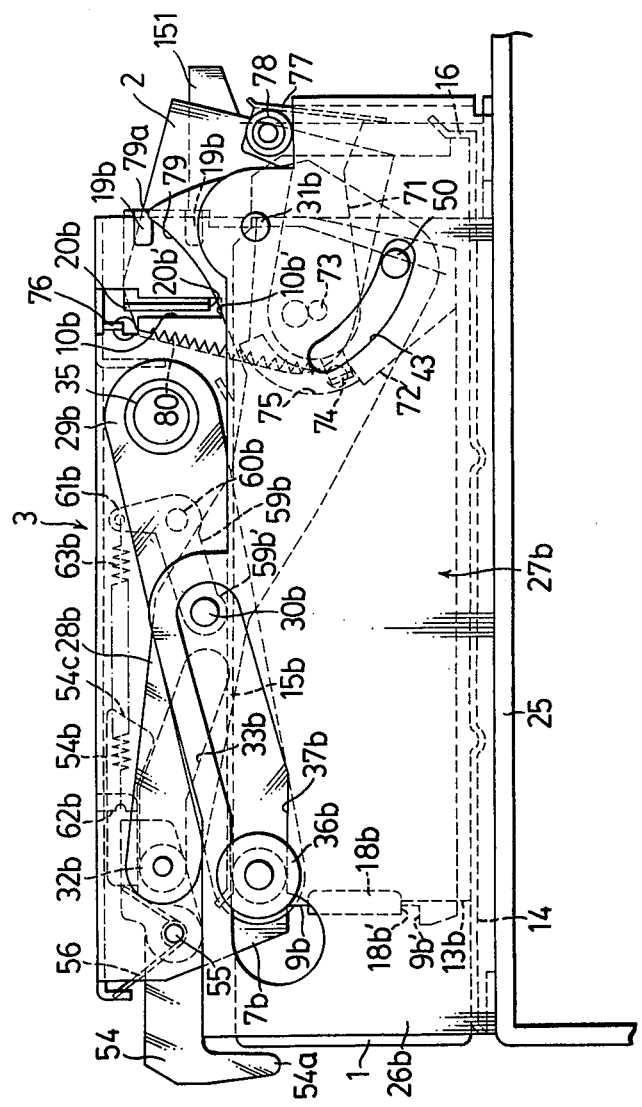

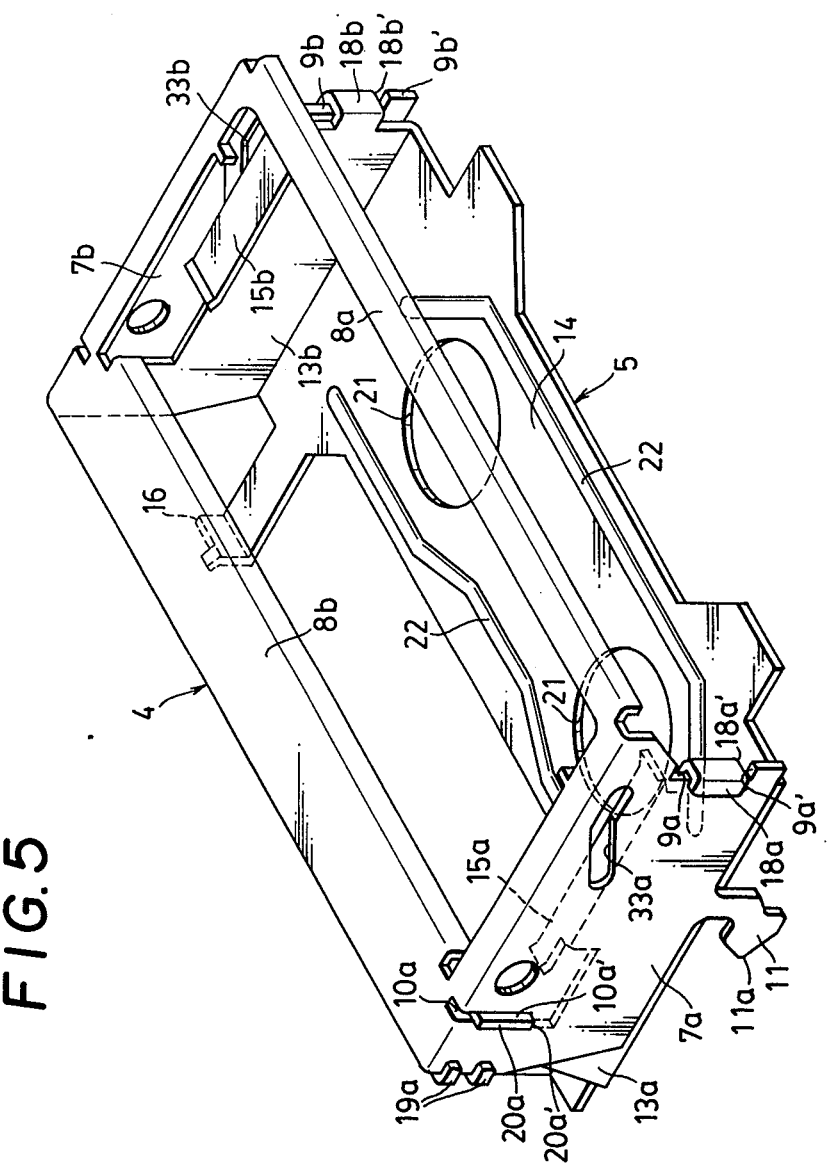

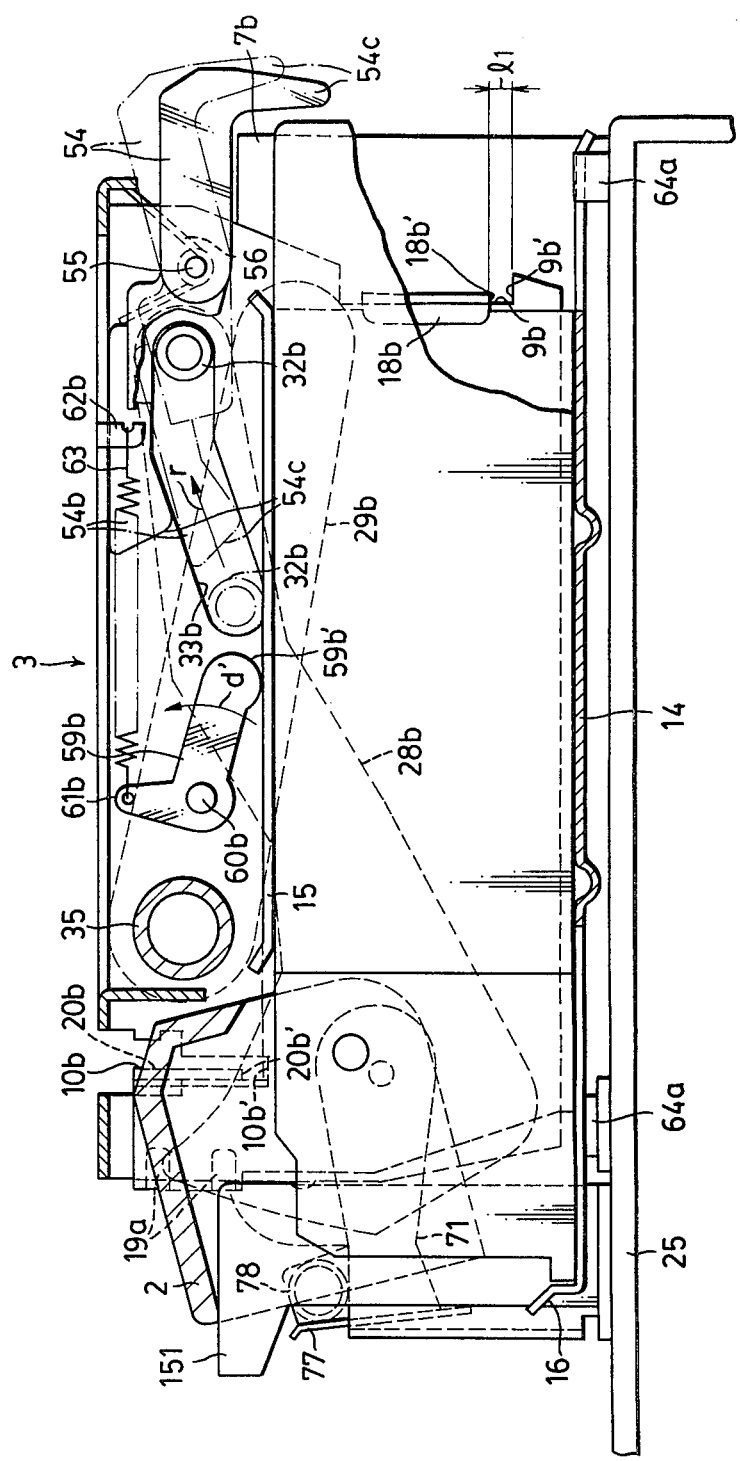

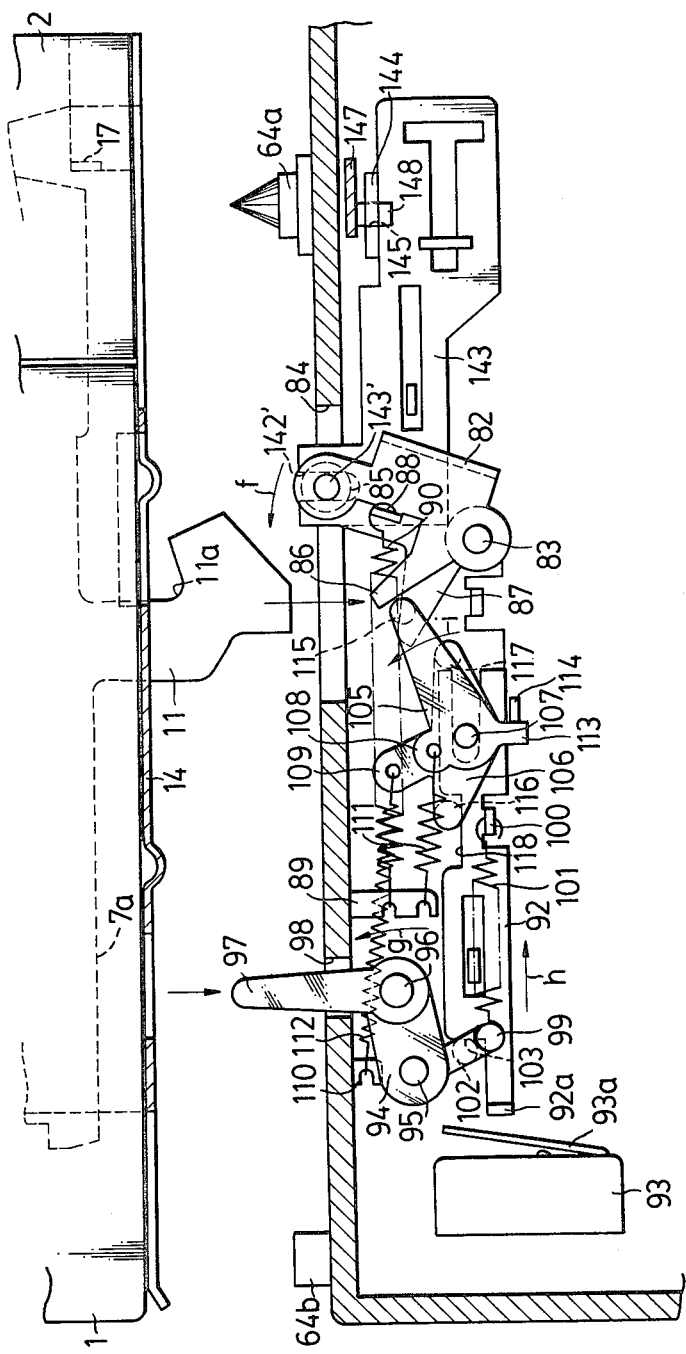

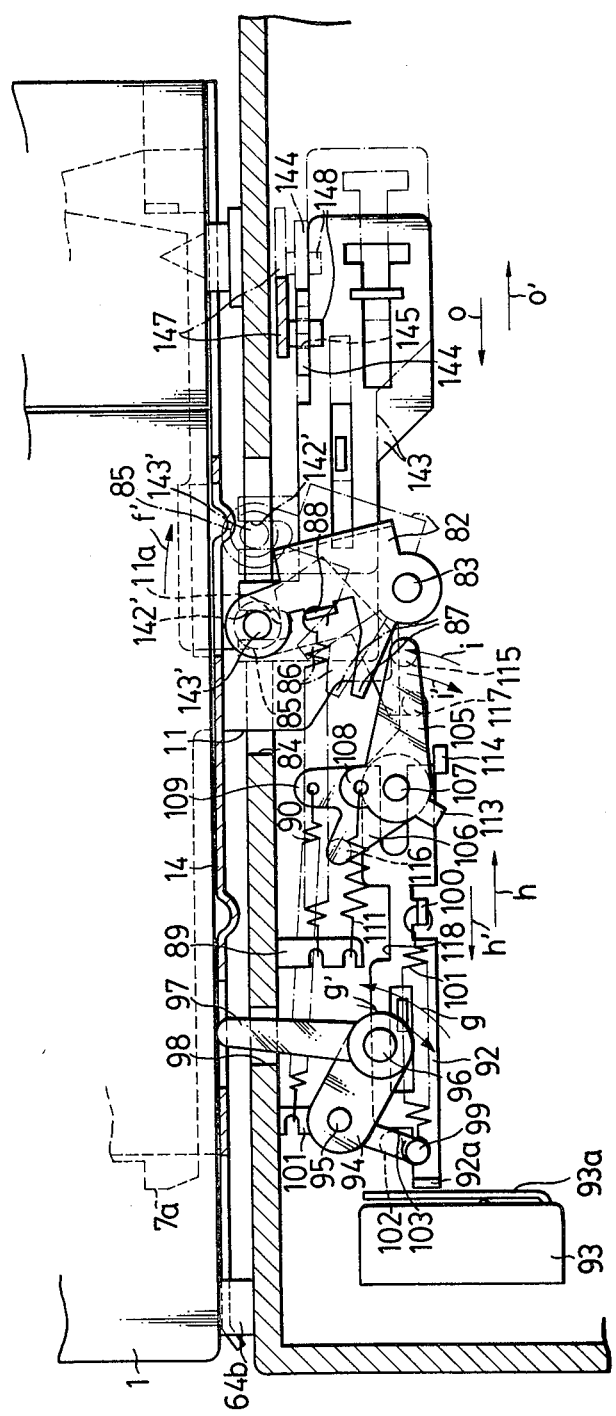

CASSETTE LOADING APPARATUS

BACKGROUND OF THE INVENTION

1. Field of the Invention

This invention relates generally to a cassette loading apparatus, and more particularly is directed to an improved cassette loading apparatus for precisely and safely positioning a cassette in an operative position, for example, in a video tape recording and/or reproducing apparatus (VTR), where video signals may be recorded on, or reproduced from a magnetic tape withdrawn from supply and take-up reels rotatable within the housing of the operatively positioned cassette.

2. Description of the Prior Art

The cassette loading apparatus of existing VTRs generally comprise a cassette holder movable between a raised, cassette-receiving position in which a cassette can be slidably inserted into the holder, and a lowered cassette-loading position in which the cassette contained in the holder is intended to be engaged, from above, with reel mounts or drive shafts and cassette positioning pins for establishing an operative position of the cassette at which the tape can be withdrawn from the cassette housing for the recording thereon, or the reproducing therefrom of video signals. In such cassette loading apparatus, the cassette must be inserted precisely in the cassette holder when the latter is in its cassette-receiving position in order to ensure that the reel mounts or drive shafts and the positioning pins of the VTR for establishing the operative position of the cassette can be inserted properly into the reel hubs and positioning holes, respectively, of the cassette when the holder is depressed or moved downwardly to its cassette-loading position. In the existing cassette loading apparatus, the holder cannot be locked in its cassette-loading position if the cassette has not been fully and accurately inserted into the holder. However, the holder of such existing cassette loading apparatus can be moved from its cassette-receiving position toward its cassette-loading position even if the inserted cassette is not properly located or fully inserted in the cassette holder. If the cassette holder is moved downwardly toward its cassette-loading position with an incorrectly or incompletely inserted cassette in the holder, the reel hubs and positioning holes of the cassette will not be properly aligned with the reel mounts or drive shafts and the positioning pins, respectively, of the VTR so that either the cassette or the drive shafts and positioning pins of the VTR will be damaged by the incorrect and clashing engagement therebetween as the cassette holder nears its cassette-loading position.

OBJECTS AND SUMMARY OF THE INVENTION

Accordingly, it is an object of this invention to provide an improved cassette loading apparatus for a recording and/or reproducing apparatus of the described type, and which avoids the above-mentioned problems associated with the prior art.

More particularly, it is an object of this invention to provide a cassette loading apparatus having a cassette holder which is movable from a cassette-receiving position toward a cassette-loading position only when a cassette inserted into the holder in the cassette-receiving position is accurately and fully inserted within the holder.

Another object is to provide a cassette loading apparatus, as aforesaid, having a cassette holder arranged to facilitate the insertion of a cassette therein when the holder is disposed in its cassette-receiving position, and in which a device is provided to securely maintain the cassette in its operative position on positioning or locating pins of the recording and/or reproducing apparatus or VTR in response to the movement of the holder from the cassette-receiving position to its lowered cassette-loading position.

In accordance with an aspect of this invention, in an apparatus, such as, a VTR, for recording and/or reproducing signals on a tape withdrawn from a reel or reels in the housing of a cassette when the latter is in an operative position determined by engagement of the cassette housing with locating pins or other means on a chassis of the VTR; a cassette loading apparatus comprises cassette holding means supported by mounting means for movements relative to the chassis between a cassette-receiving position remote from the chassis, and in which a cassette can be inserted in, and removed from the holding means, and a cassette-loading position in which a cassette in a predetermined or correct position in the holding means is engageable with the locating means for disposition in its operative position, and detecting means engageable with a cassette inserted in the holding means for preventing movement of the latter from said cassette-receiving position toward the cassette-loading position in the event that the engaged cassette deviates from the predetermined or correct position in respect to the holding means.

It is another feature of this invention to provide the cassette holding apparatus with a holding means which, in its cassette-receiving position, is arranged to permit the relatively loose, slidable insertion or removal of a cassette therein, and in which, in response to the movement of the holding means from its cassette-receiving position to its cassette-loading position, causes a spring loaded device to exert an increased yieldable pressure on the cassette for securely maintaining the latter in precise engagement with the positioning or locating pins of the VTR.

It is still another feature of the cassette loading apparatus according to this invention to provide the same with a device by which the usual pivoted cover or lid of the cassette housing is rapidly moved toward its opened position in response to the initial movement of the cassette holding means from its cassette-receiving position toward its cassette-loading position, thereby to ensure that the cover or lid will be fully opened when the cassette attains its operative position.

The above, and other objects, features and advantages of the invention, will be apparent in the following detailed description of an illustrative embodiment thereof which is to be read in connection with the accompanying drawings in which the same reference numerals are employed to identify the corresponding parts of the apparatus in the several views of the drawings.

BRIEF DESCRIPTION OF THE DRAWINGS

FIGS. 2A, 2B and 2C are side elevational views of the cassette loading apparatus, as viewed from the left-hand side in FIG. 1, and which show the apparatus in various respective stages of its operation;

FIGS. 3A, 3B and 3C are side elevational views generally corresponding to FIGS. 2A, 2B and 2C, respectively, but showing the cassette loading apparatus as viewed from the right-hand side in FIG. 1;

FIG. 5 is a perspective view showing the upper and lower holder members of FIG. 4 assembled together to form the cassette holder;

FIGS. 6A and 6B are longitudinal sectional views of the cassette loading apparatus with its cassette holder illustrated in its elevated or cassette-receiving position and in its lowered or cassette-loading position, respectively, and to which reference will be made in explaining the operation of devices which are respectively operative for preventing movement of the cassette holder to its cassette-loading position if a cassette is not fully or accurately inserted therein, and for ensuring that a cassette will be firmly held in its operative position upon movement of the cassette holder to its cassette-loading position;

FIGS. 9A, 9B and 9C are enlarged, fragmentary vertical sectional views taken through the cassette loading apparatus embodying this invention adjacent the left-hand side thereof, as viewed on FIG. 1, and which show a locking device of the cassette loading apparatus in various conditions thereof;

DETAILED DESCRIPTION OF A PREFERRED EMBODIMENT

Figure 1:
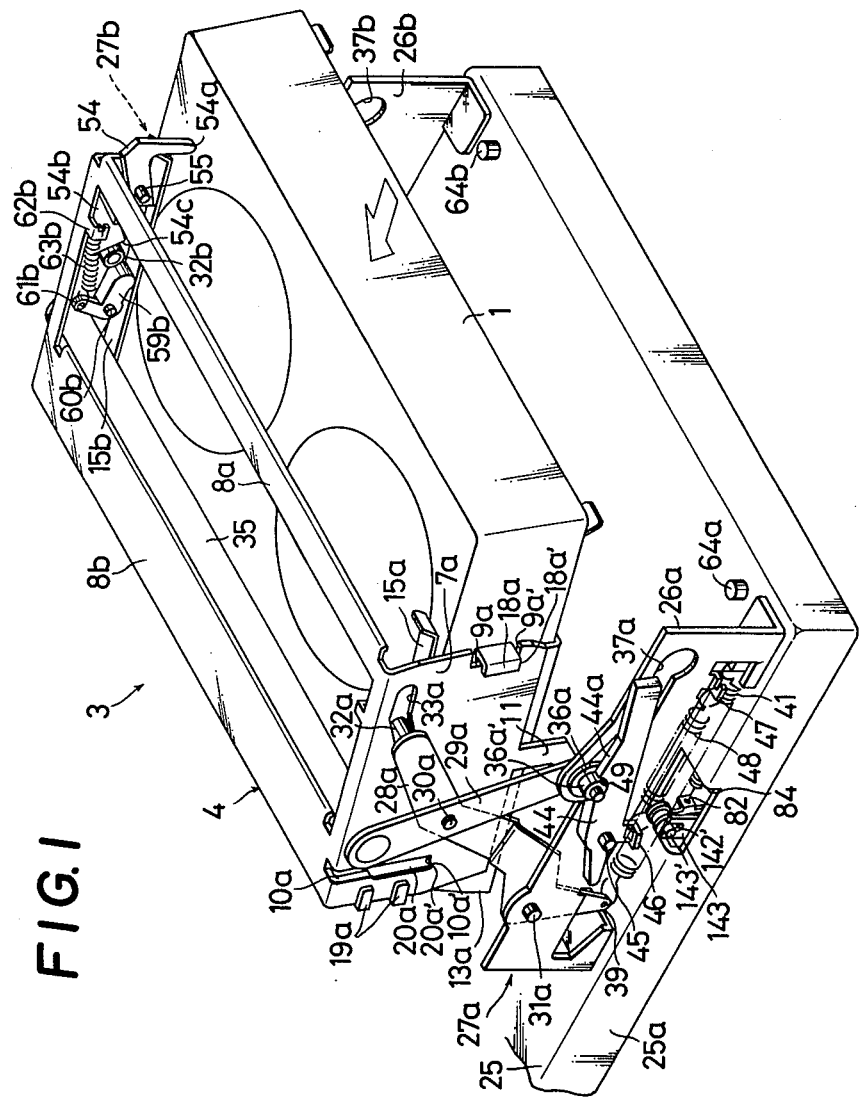
FIG. 1 is a perspective view showing the main components of a cassette loading apparatus according to an embodiment of this invention, and which is shown with its cassette holder in an elevated position for receiving or discharging a cassette.

Referring to FIGS. 1, 2A–2C and 3A–3C, it will be seen that a well known cassette 1 for use in a cassette loading apparatus according to this invention has a cover or lid 2 capable of being opened and closed by being attached pivotably to the front of the cassette 1. The cassette loading apparatus generally comprises a cassette holder 3 composed of an upper holder member 4 and a lower holder member 5. As shown in FIG. 4, upper holder member 4 has a pair of side plates 7a and 7b connected integrally with each other, at their upper edges, through lateral connecting plates 8a and 8b disposed adjacent the opposite ends of side plates 7a and 7b. The side plates 7a and 7b have notches 9a and 9b formed in their front edges and slits 10a and 10b formed in the upper portions adjacent the rear ends. At the center of the lower edge of side plate 7a there is integrally formed a locking piece 11 which projects downward therefrom. As also shown on FIG. 4, lower holder member 5 has a pair of side plates 13a and 13b connected integrally with each other at their lower edges through a bottom plate 14. At the upper edges of side plates 13a and 13b there are integrally formed a pair of inwardly bent, cassette insertion guides 15a and 15b, respectively. At the opposite side portions of the rear part of bottom plate 14 there are integrally formed a cassette stopper 16 for restricting the amount of insertion of the cassette 1 and an unlocking element 17 for unlocking the lid or cover 2 of cassette 1. At the front edges of side plates 13a and 13b, and at the front and rear edges of upward extensions of rear portions of side plates 13a and 13b there are integrally formed bent tabs 18a, 18b, 19a, 19b and 20a, 20b, respectively. In the bottom plate 14 there are formed a pair of laterally spaced apertures 21 for insertion therethrough of reel mounts or drive shafts and the front and back of plate 14 have cutouts for the insertion of cassette positioning pins. Further, grooved ribs 22 are formed in bottom plate 14 for reinforcement.

As shown in FIG. 5, the cassette holder 3 is assembled by inserting lower holder member 5 into the inside of the upper holder member 4. In this case, the bent tabs 18a, 18b and 20a, 20b of lower holder member 5 are inserted into and thereby engaged with notches 9a and 9b and slits 10a and 10b of upper holder member 4, respectively, and the bent tabs 19a and 19b of lower holder member 5 are engaged with the rear edges of side plates 7a and 7b, respectively, of upper holder member 4. By reason of the foregoing, holder member 5 is movable within a predetermined range in the vertical direction relative to upper holder member 4 while its longitudinal and transverse movements with respect to upper holder member 4 are restricted.

The cassette holder 3 is disposed above a base or chassis 25 on which, at its left and right sides, there are mounted a pair of erect holder supporting plates 26a and 26b, respectively. Furthermore, a pair of left and right holder mounting mechanisms 27a and 27b are attached to the holder supporting plates 26a and 26b, respectively, whereby holder 3 is movable up and down between a cassette-receiving position shown in FIGS. 2A and 3A and a cassette-loading position shown in FIGS. 2C and 3C.

The illustrated holder mounting mechanisms 27a and 27b are so-called cross-type link mechanisms wherein pivotal levers 28a and 28b cross pivotal levers 29a and 29b, respectively, at nearly central portions thereof and are there connected by pins 30a and 30b so that levers 28a and 29a and levers 28b and 29b are pivotable with respect to each other. The lower ends of pivotable levers 28a and 28b are pivotally mounted on holder supporting plates 26a and 26b by pivot pins 31a and 31b, respectively, while the respective upper ends have guide rollers 32a and 32b rotatably mounted thereon and engaged in guide grooves 33a and 33b, respectively, formed in side plates 7a and 7b of upper holder member 4. The upper ends of the other pivotable levers 29a and 29b are fixed to respective ends of a connecting shaft 35 disposed horizontally therebetween and being journaled in side plates 7a and 7b. At the lower ends of pivotable levers 29a and 29b there are rotatably mounted guide rollers 36a and 36b, respectively, which are inserted in guide grooves 37a and 37b formed in holder supporting plates 26a and 26b, respectively. The laterally aligned guide grooves 33a and 33b and the laterally aligned guide grooves 37a and 37b are generally of doglegged form so that they are opposed nearly symmetrically and contrary to each other in the vertical direction.

Figure 2B:
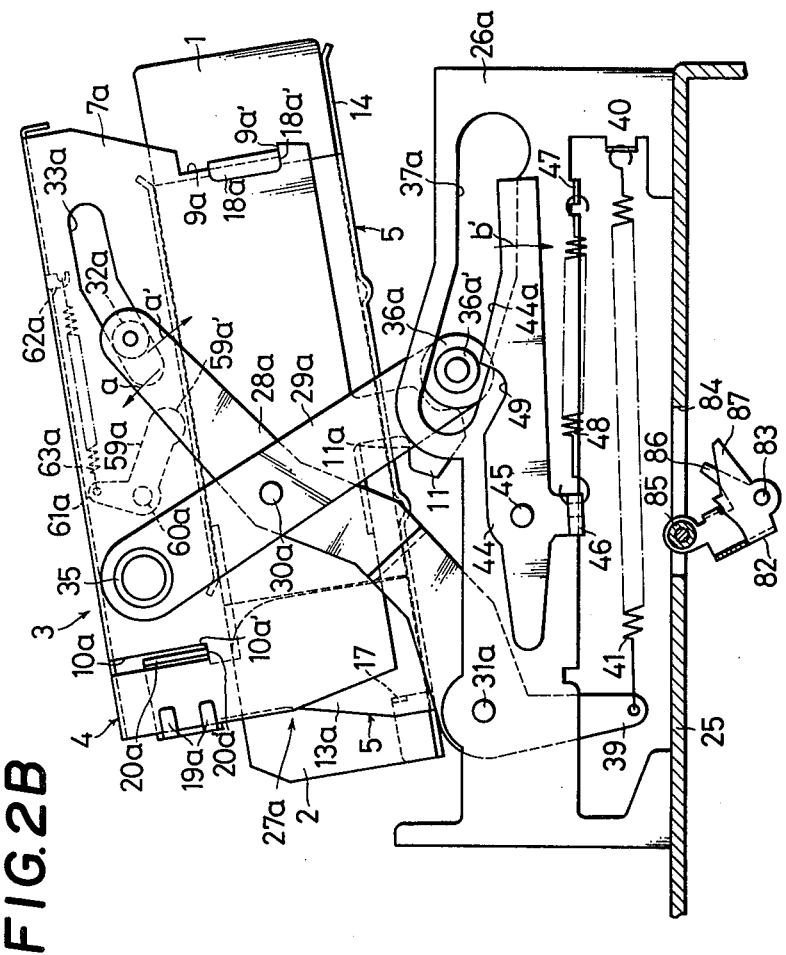

The connecting pins 30a and 30b, the connecting pins 31a and 31b and the guide rollers 36a and 36b are axially aligned with one another. A tension spring 41 (FIGS. 2A-2C) is stretched between an arm 39 which extends radially downward from pivot pin 31a of lever 28a and is integral with the latter and a spring anchor 40 formed on holder supporting plate 26a. Tension spring 41 angularly biases pivotable lever 28a in the direction of arrow "a" on FIG. 2A. In response to the pivotal movement of lever 28a in the direction of arrow "a", the associated pivotable lever 29a is pushed up at connecting pin 30a and through the connecting shaft 35 the pivotable levers 29b and 28b at the other side of holder 3 are also pivotally biased in the direction of arrow "a" in FIG. 3A. As a consequence of the pivotal movement of pivotable levers 28a, 28b, 29a and 29b in the directions of the arrows "a", the cassette holder 3 is raised to its cassette-receiving position shown in FIGS. 2A and 3A and in which guide rollers 32a, 32b and 36a, 36b are brought into abutment with the rear ends of guide grooves 33a, 33b and 37a, 37b, respectively, and the cassette holder 3 assumes an inclined posture as shown in FIG. 2A.

A holder positioning lever 44 is pivotably attached, through a pivot pin 45, to holder supporting plate 26a, and by means of a tension spring 48 stretched between a spring anchor 46 formed on holder positioning lever 44 and a spring anchor 47 formed on holder supporting plate 26a, lever 44 is pivotally biased in the direction of the arrow "b" in FIG. 2A. Thus, the upper edge surface 44a of holder positioning lever 44 is urged to abut the lower surface of an end portion 36a' of guide roller 36a. The upper surface 44a of lever 44 is formed with a recess 49 positioned to receive guide roller end portion 36a' when cassette holder 3 has been raised to the cassette-receiving position, as shown in FIG. 2A. Furthermore, as shown on FIGS. 3A-3C, a guide pin 50 is fixed to the lower end portion of lever 28b and is inserted in an arcuate guide groove 43 which has its curvature centered at pivot pin 31b and which is formed in holder supporting plate 26b.

Figure 6A:
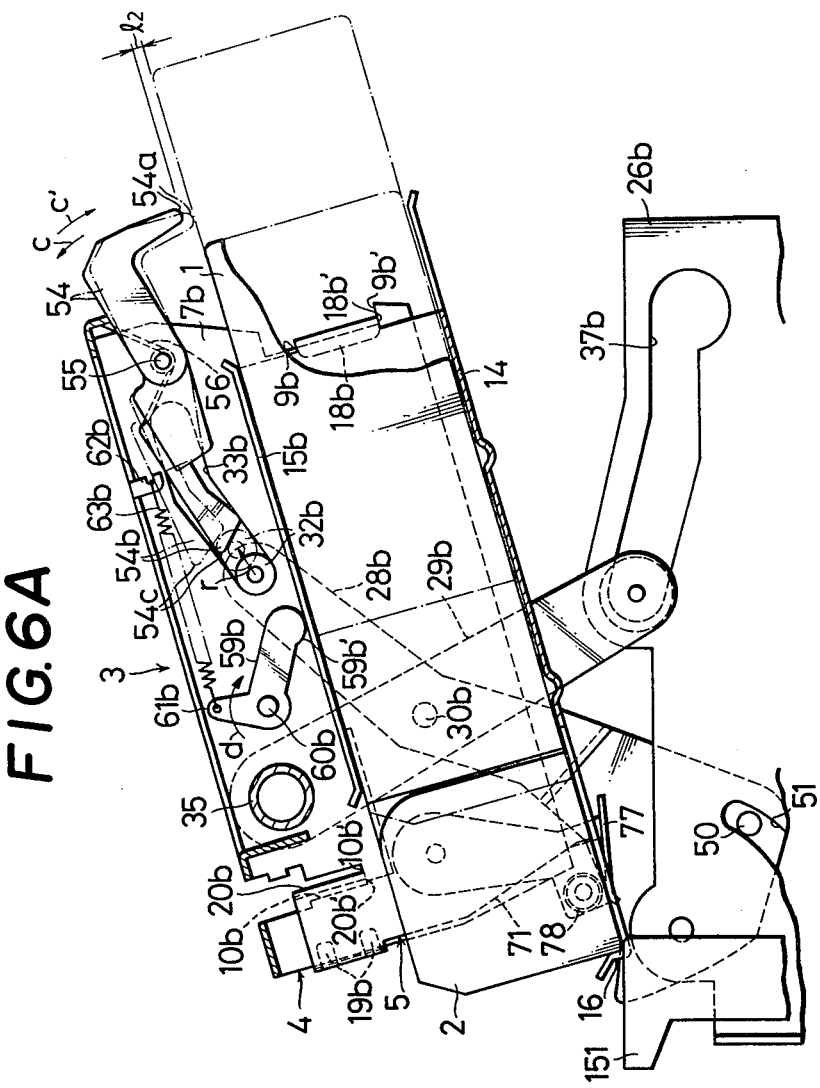
Figure 7:
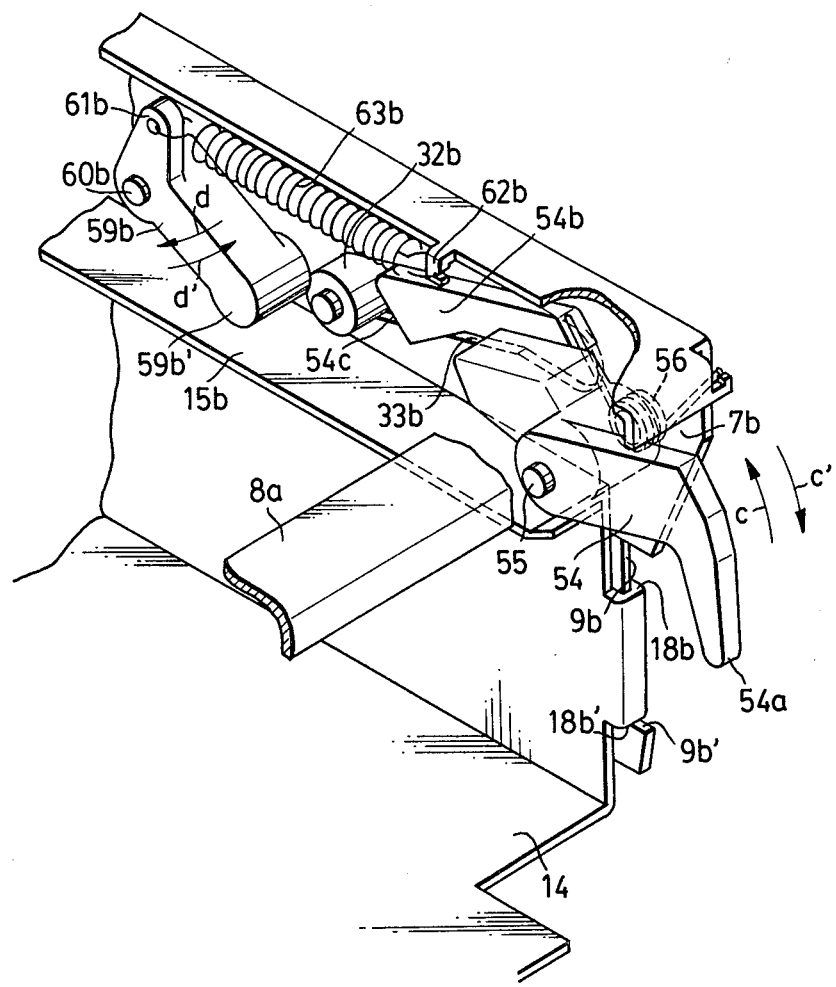
FIG. 7 is an enlarged, fragmentary perspective view showing details of elements provided in accordance with the invention and shown more generally on FIGS. 6A and 6B.

Referring now to FIGS. 3A to 3C, 6A, 6B and 7, it will be seen that, in accordance with the invention, a cassette detecting lever 54 is provided for detecting the state of insertion of cassette 1 in cassette holder 3. The cassette detecting lever 54 is mounted for vertical swinging about a pivot pin 55 extending inwardly from the front end portion of side plate 7b of the upper holder member 4 of cassette holder 3. The cassette detecting lever 54 has a forward tip end 54a which is bent in a downward direction, while its other end portion 54b extends along the inside of guide groove 33b. The cassette detecting lever 54 is pivotally biased in the direction of arrow "c" on FIG. 6A by means of a torsion spring 56 fitted on pivot pin 55, and a part of cassette detecting lever 54 is engageable upwardly against a flange on connecting plate 8a whereby the aforesaid pivotal movement of cassette detecting lever 54 is restricted. As shown in FIG. 6A, cassette detecting lever 54 is positioned so that, when cassette holder 3 has been raised to the foregoing cassette-receiving position, an inclined end face 54c of the other end portion 54b of cassette detecting lever 54 is opposed to guide roller 32b in guide groove or slot 33b.

Referring now to FIGS. 2A to 2C, 3A to 3C, 6A, 6B and 7, it will be seen that, in the cassette loading apparatus according to this invention, a pair of cassette pressing levers 59a and 59b are provided for pressing the cassette 1 onto cassette positioning pins 64a and 64b (FIGS. 1, 6B and 9A-9C) fixed on chassis 25 when holder 3 is in the cassette-loading position. The cassette pressing levers 59a and 59b, which are each of generally L-shaped configuration, are mounted for vertical pivoting on pivot pins 60a and 60b at nearly central positions along the insides of side plates 7a and 7b of the upper holder member 4. The cassette pressing levers 59a and 59b are pivotally biased in the direction of arrow "d" in FIGS. 2A and 3A by means of tension springs 63a and 63b, respectively, which are stretched between spring bearing arms 61a and 61b of cassette pressing levers 59a and 59b and anchors 62a and 62b formed on upper holder member 4. By the spring urged pivotal movement of cassette pressing levers 59a and 59b, their tip end portions 59a' and 59b' are urged against the upper surfaces of cassette insertion guides 15a and 15b on lower holder member 5, whereby the lower holder member 5 is moved downward with respect to upper holder member 4. Such downward movement of lower holder member 5 relative to upper holder member 4 is limited by the engagement of lower end faces 18a', 28b', 20a' and 20b' of bent tabs 18a, 18b, 20a and 20b of lower holder member 5 with lower edges 9a' and 9b', and 10a' and 10b' of notches 9a and 9b, and of slits 10a and 10b, respectively.

Referring now to FIGS. 3A to 3C and 8A to 8C, it will be seen that a cover opening lever 71 for opening the lid or cover 2 of cassette 1 is inserted between a laterally offset portion 72 of side plate 7b formed at the lower portion adjacent the rear end of side plate 7b (FIG. 4) and the corresponding portion of side plate 13b of lower holder member 5, and lever 71 is pivoted on portion 72 through a pivot pin 73. At the upper end of cover opening lever 71 there is formed a spring bearing tab 74 which extends through an elongated arcuate, aperture 75 in side plate 7b and projects outside the latter. The cover opening lever 71 is pivotally biased in the direction of arrow "e" in FIG. 3A by means of a tension spring 80 stretched between the spring bearing tab 74 and a spring anchor 76 formed on side plate 7b. The angular displacement of cover opening lever 71 in the direction "e" is limited by the abutment of lever 71 with the lower end of a bent portion 72a of offset portion 72. At the lower end of cover opening lever 71 there is an integrally formed flange 77 which is directed toward the inside of cassette holder 3, and a roller 78 is rotatably mounted at the outside of the lower end portion of cover opening lever 71. Above the pivot pin 31b supporting lever 28b, the latter is formed with a roller guide face 79 for guiding roller 78 of the cover opening lever 71. The roller guide face 79 is in the form of a generally arcuate, upwardly curved edge surface.

Referring now to FIGS. 2A to 2C, 9A to 9C, 10, 11 and 12, it will be seen that a holder locking lever 82 for locking cassette holder 3 in its cassette-loading position is mounted at its lower end portion, on a pivot pin 83 at the inside of a side wall or flange 25a of chassis 25 so that the upper end of lever 82 can swing in the longitudinal direction within an opening 84 formed in chassis 25. The upper end of holder locking lever 82 carries a rotatable roller 85, and right and left projections 86 and 87 extend integrally from the lower portion of lever 82. The holder locking lever 82 is pivotally biased in the direction of arrow "f" in FIG. 9A by means of a tension spring 90 stretched between a spring anchor 88 formed on lever 82 and a spring anchor or tab 89 formed on chassis 25. Inside the side wall 25a of chassis 25 there is mounted a switch operating slider 92 which is slidable in the longitudinal direction, and has a tip end 92a disposed in opposing relation to an actuator 93a of a cassette-loading detection switch 93, which may be a microswitch fixed to side wall 25a. Moreover, at the inside of side wall 25a of chassis 25 there is a cassette loading detection lever 94 pivoted on a pivot pin 95. A cassette sensing member 97 extends pivotally from a pin 96 on cassette loading detection lever 94 and projects above chassis 25 through an aperture 98 in the latter. A tension spring 101 is stretched between a spring anchor 99 formed on cassette loading detection lever 94 and a spring anchor 100 formed on switch operating slider 92. A pin 102 is formed integrally with lever 94 in a position closer to pivot pin 95 than the spring anchor 99, and pin 102 is in abutment with a step 103 on switch operating slider 92. As a result of the foregoing, cassette loading detection lever 94 is pivotally biased in the direction of arrow "g" in FIG. 9A by means of tension spring 101, so that cassette sensing member 97 is biased upward through aperture 98, and pin 102 on cassette loading detection lever 94 causes switch operating slider 92 to be moved in the direction of arrow "h" on FIG. 9A.

At the inside of side wall 25a of chassis 25 there are mounted a control lever 105 for holder locking lever 82 and a locking lever 106 for switch operating slider 92, with both levers 105 and 106 being pivoted on a common pivot pin 107. The levers 105 and 106 are pivotally biased in the direction of arrow "i" in FIG. 9A by tension springs 111 and 112 respectively stretched between spring bearing portions 108 and 109 formed integrally with levers 105 and 106 and spring anchors 89 and 110 on chassis 25. A projection 113 formed integrally with control lever 105 abuts a projection 114 extending from side wall 25a, whereby pivotal movement of control lever 105 in the direction of the arrow "i" is restricted. The projection 86 of holder locking lever 82 engages a pin 115 formed integrally with the tip end of control lever 105 whereby the pivotal movement of lever 82 in the direction of the arrow "f" by the tension spring 90 is restricted. Furthermore, at the opposite ends of locking lever 106 there are integrally formed a pair of pins 116 and 117, with pin 116 being engageable in a locking recess 118 formed in switch operating slider 92.

Figure 11:
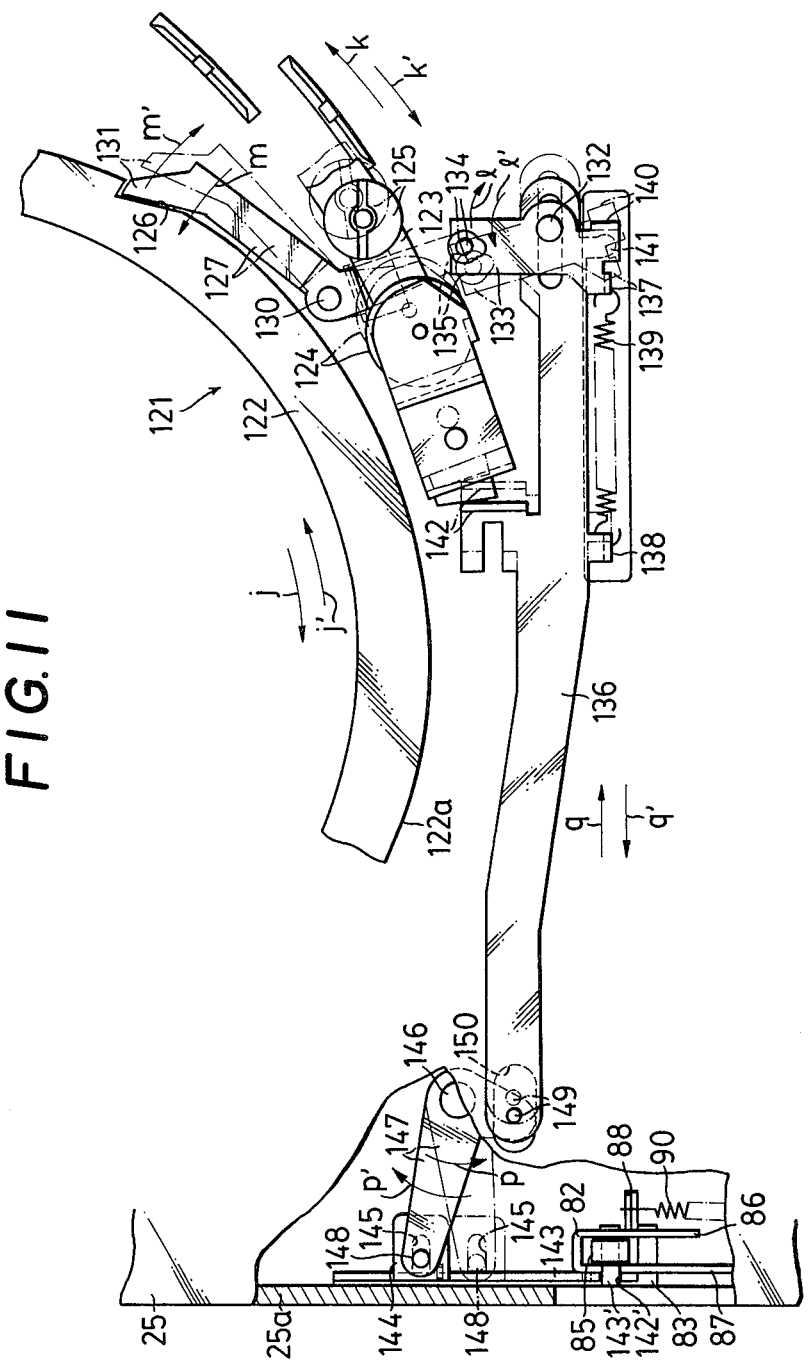
FIG. 11 is a top plan view of a portion of the assembly shown on FIG. 10 in association with a portion of a tape loading ring included in the tape loading apparatus.
Figure 12:
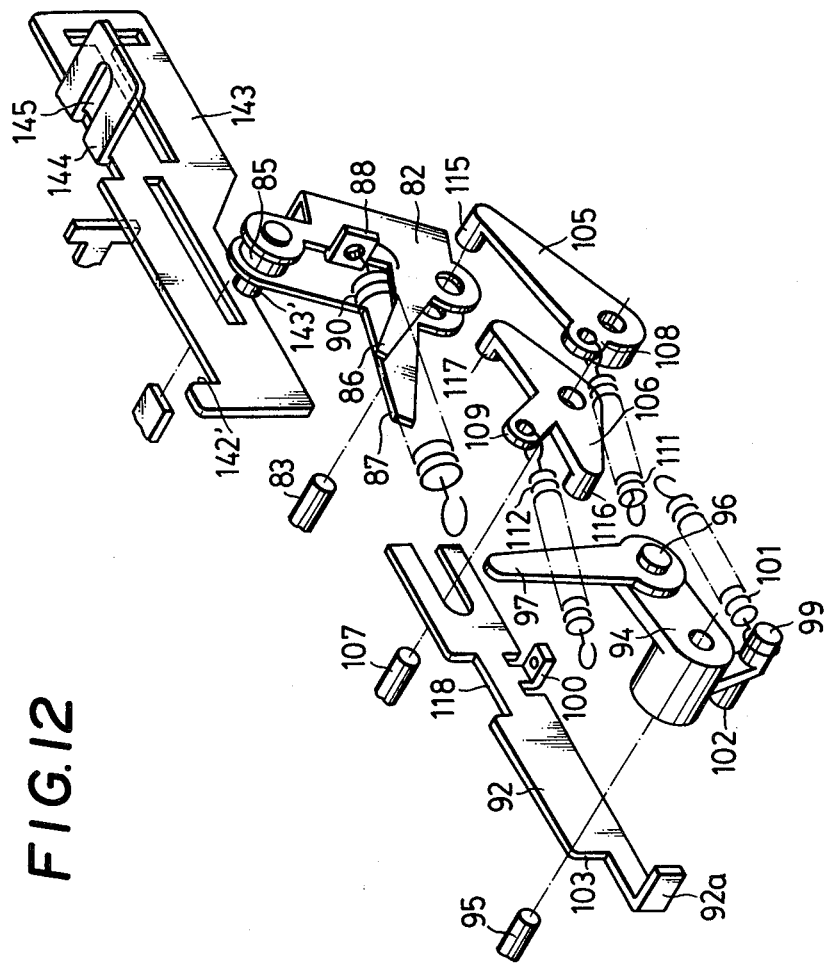
FIG. 12 is an exploded perspective view of several of the elements shown on FIGS. 9A–9C, 10 and 11 for illustrating details thereof.

Referring now to FIGS. 11 and 12, it will be seen that a tape loading apparatus 121 of a VTR to be provided with a cassette loading apparatus according to this invention may include a tape loading ring 122 and a tape loading slider 123. After holder 3 with a cassette 1 therein is moved to its cassette-loading position, tape loading ring 122 is conventionally turned in the direction of arrow "j" in FIG. 11, and in synchronism therewith, tape loading slider 123 is slidably displaced in an arcuate path in the direction of arrow "k" on FIG. 11. As is well known, as a result of such movements of ring 122 and slider 123, tape is drawn out of the operatively positioned cassette 1 and is guided in a predetermined tape running path which, at least in part, extends about a guide drum (not shown). For this purpose, tape loading ring 122 is constructed to move a number of tape loading guides (not shown) along a predetermined path. For the same purpose, the upper portion of tape loading slider 123 is shown to have mounted thereon a pinch roller 124 and at least a tape loading guide 125.

For the unloading of the tape, tape loading ring 122 and slider 123 are returned in the directions of arrows j' and k', respectively, in FIG. 11. At the completion of the tape unloading operation, tape loading ring 122 is stopped in the returned position indicated in solid lines in FIG. 11, while tape loading slider 123, after reaching the position indicated in solid lines in FIG. 11, is moved back in the direction of arrow "k" through a distance of several millimeters and is stopped in the returned positions shown in phantom lines.

A ring locking lever 127 is provided for locking tape loading ring 122 in the returned position shown in FIG. 11 by engaging in a locking recess 126 suitably located in the outer peripheral surface 122a of ring 122. The ring locking lever 127, which is generally L-shaped, is pivotally supported on a pivot pin 130 on chassis 25, and a locking pawl 131 formed on the tip end of ring locking lever 127 is adapted to engage in locking recess 126. A change lever 133 is pivotably supported on a pivot pin 132 carried by chassis 25. To the end of the ring locking lever 127 remote from pawl 131 there is fixed a pin 134 which engages in a slot 135 formed in one end of change lever 133. A detection slider 136 for detecting the completion of tape unloading operation is mounted slidably on chassis 25 in an approximately orthogonal state with respect to change lever 133. The change lever 133 is pivotally biased in the direction of arrow "l" in FIG. 11 by means of a tension spring 139 stretched between a spring anchor 137 formed at the end of change lever 133 remote from slot 135 and a spring anchor 138 formed integrally with detection slider 136, and, as a result of the foregoing, ring locking lever 127 is pivotally biased in the direction of arrow "m" in FIG. 11. A projection 140 formed at the same end of change lever 133 as spring anchor 137 abuts against a projection 141 formed at an adjacent end of detection slider 136 whereby the pivotal movement of lever 133 in the direction of the arrow "l" is restricted. Moreover, at an intermediate part of detection slider 136 there is formed a detecting projection 142 engageable by the tape loading slider 123 as hereinafter described.

At the inside of side wall 25a of chassis 25 there is also mounted an interlocking slider 143 so as to be slidable in the longitudinal direction. At one end of interlocking slider 143 there is formed a shoulder 142' (FIG. 12) against which is engageable an end of a supporting shaft 143' for roller 85 of holder locking lever 82, while at the other end of the interlocking slider 143 there is provided a bent piece 144 in which is formed a lateral slot 145. A change lever 147 (FIGS. 10 and 11) is attached to the underside of chassis 25 by a pivot pin 146, and a pin 148 formed at one end of change lever 147 is engaged in slot 145. The change lever 147 is generally L-shaped, and a pin 149 formed on its other end extends through an aperture 150 in chassis 25 so as to project above the latter where pin 149 is connected to the end of detection slider 136 remote from change lever 133.

The cassette loading and unloading operations of the above described apparatus embodying this invention are as follows:

Beginning with cassette holder 3 in its raised state or cassette-receiving position shown in FIGS. 2A and 3A, recess 49 of holder positioning lever 44 receives end portion 36a' of guide roller 36a whereby cassette holder 3 is positioned stably in its cassette-receiving position. At this time, the tape loading apparatus 121 is in its completely unloaded state or condition and, as indicated with solid lines in FIG. 11, locking pawl 131 of ring locking lever 127 is engaged in locking recess 126 of tape loading ring 122 whereby the latter is secured in its returned position. Further, in this initial state of the cassette loading apparatus, holder locking lever 82 is in its non-locking position shown in FIG. 2A.

Figure 8A:
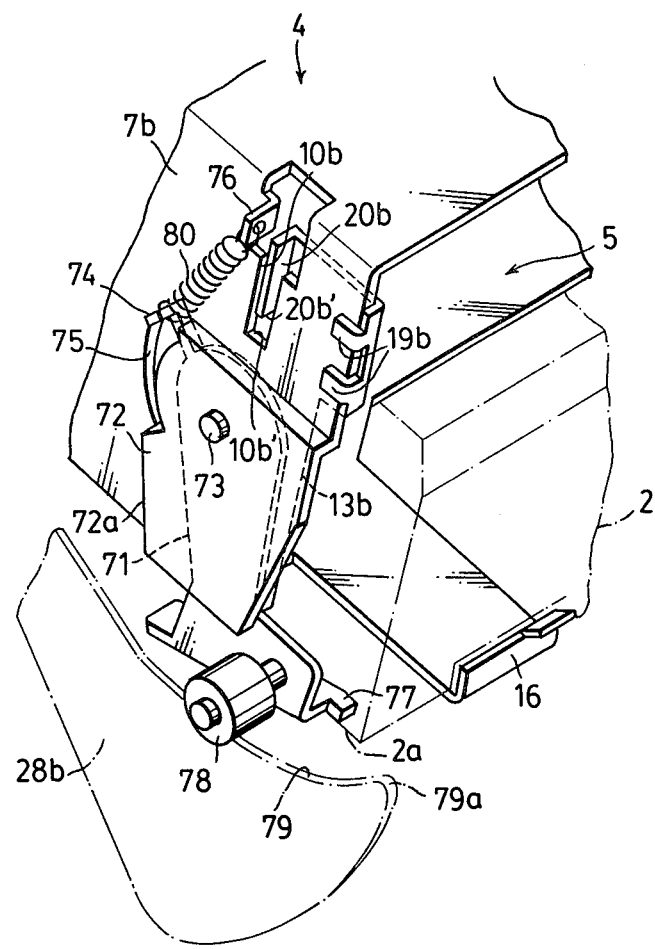
FIGS. 8A, 8B and 8C are enlarged, fragmentary perspective views illustrating details of a device provided in the cassette loading apparatus for opening the cover or lid of the cassette upon movement of the latter toward its operative position by the cassette holder.

For loading a cassette 1, the latter is inserted obliquely into cassette holder 3 while the latter is in its raised or cassette-receiving position. Such insertion is effected with the lid or cover 2 of the cassette 1 at the leading side thereof. The cassette 1 is inserted between the bottom plate 14 of lower holder member 5 and cassette insertion guides 15a and 15b. Because cassette holder 3 is stably positioned in its cassette-receiving position, the insertion of cassette 1 can be effected smoothly without causing any accidental shaking of cassette holder 3. The cassette 1 is inserted until it abuts cassette stopper 16 and is thereby stopped, and, as heretofore known, unlocking piece 17 is inserted relatively into the housing of inserted cassette 1 to unlock the lid or cover 2. At the completion of this cassette insertion, the lower surface of one end portion 2a of lid or cover 2 rides onto the flange 77 of cover opening lever 71, as is shown in FIG. 8A.

Figure 2C:
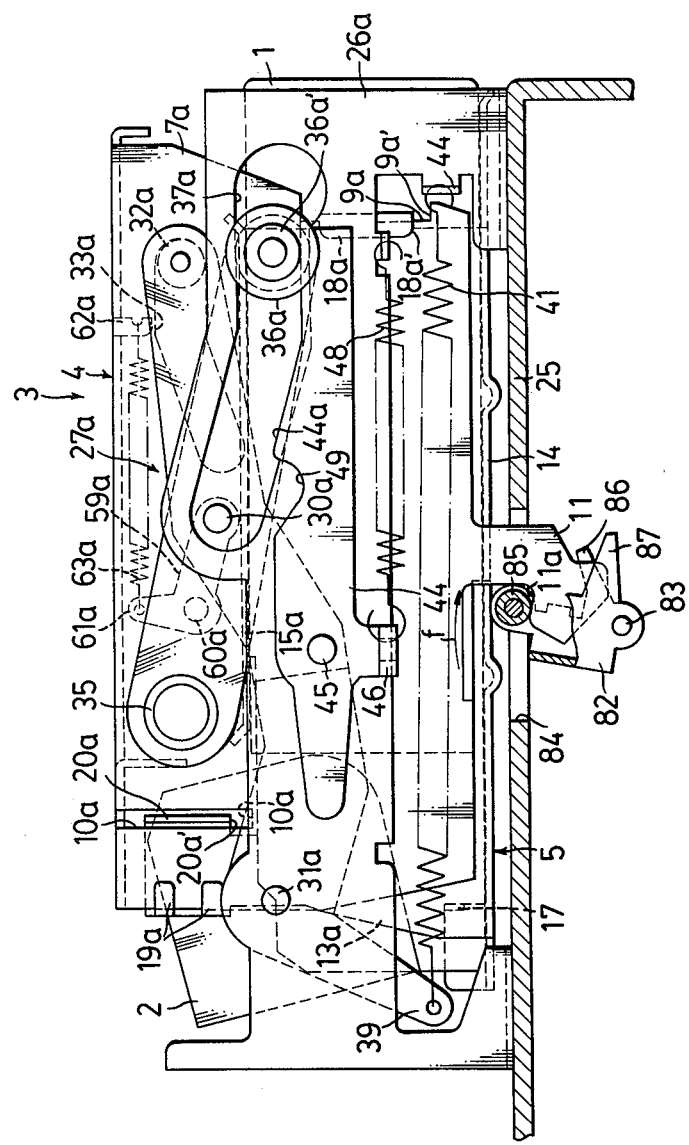

Then, after insertion of the cassette 1 in the above-described manner, cassette holder 3 is manually pushed from above so as to be depressed to the cassette-loading position shown in FIGS. 2C and 3C.

At the moment cassette holder 3 begins to move downwardly, end portion 36a' of guide roller 36a on pivotable lever 29a pushes holder positioning lever 44, so that the latter is displaced pivotally in the direction of arrow b' on FIG. 2B against the tension of spring 48 and end portion 36a' is disengaged from recess 49 of lever 44. In response to depression of cassette holder 3, pivotable lever 29a pushes down the other pivotable lever 28a through connecting pin 30a, so that pivotable lever 28a is moved pivotally in the direction of arrow a' on FIG. 2B against the force of tension spring 41 and guide roller 36a on pivotable lever 29a is moved along guide groove 37a. Thus, pivotable lever 29a is pivoted about the connecting pin 30a in the direction of arrow "n" on FIG. 2A with respect to pivotable lever 28a. The pivoting of lever 29a is transmitted to pivotable lever 29b at the other side of holder 3 through connecting shaft 35, so that lever 29b is pivoted in the direction of arrow "n" on FIG. 3A and the respective pivotable lever 28b is also pivoted in the direction of arrow a' in FIG. 3A through connecting pin 30b. Thus, the pairs of pivotable levers 28a, 29a and 28b, 29b of holder mounting mechanisms 27a and 27b are interlocked with each other and are pivoted in the directions of the arrows a' and "n" as cassette holder 3 is forced down against the tension of spring 41. During such pivotal movements, the guiding action of the pairs of guide grooves 33a, 33b and 37a, 37b and the pairs of guide rollers 32a, 32b and 36a, 36b gradually brings cassette holder 3 to its final substantially horizontal orientation at the cassette-loading position (FIGS. 2C and 3C) of holder 3.

In the above cassette loading operation, until the reduced end portion 36a' of guide roller 36a comes out of recess 49 of holder positioning lever 44, it is necessary to depress the cassette holder 3 somewhat strongly to commence the downward movement of holder 3. However, after end portion 36a' emerges from recess 49, the force necessary for depressing cassette holder 3 is reduced so the cassette holder can be brought down quickly and smoothly to the cassette-loading position.

Figure 9B:
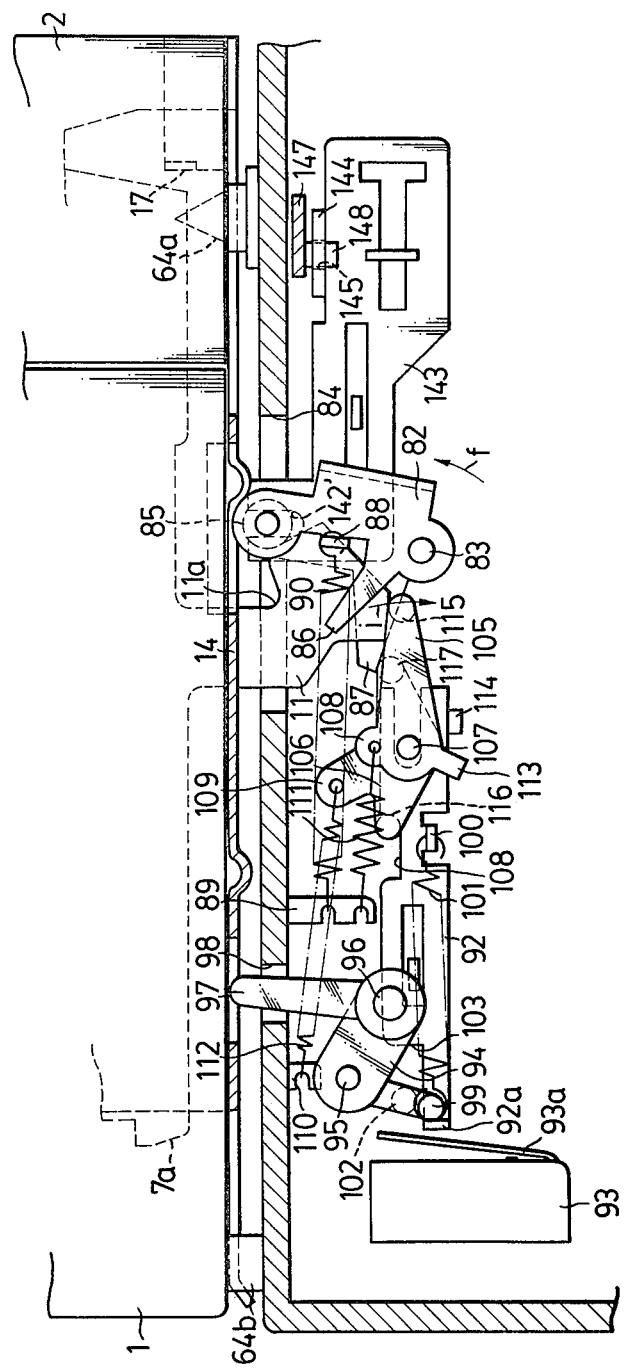
Figure 10:
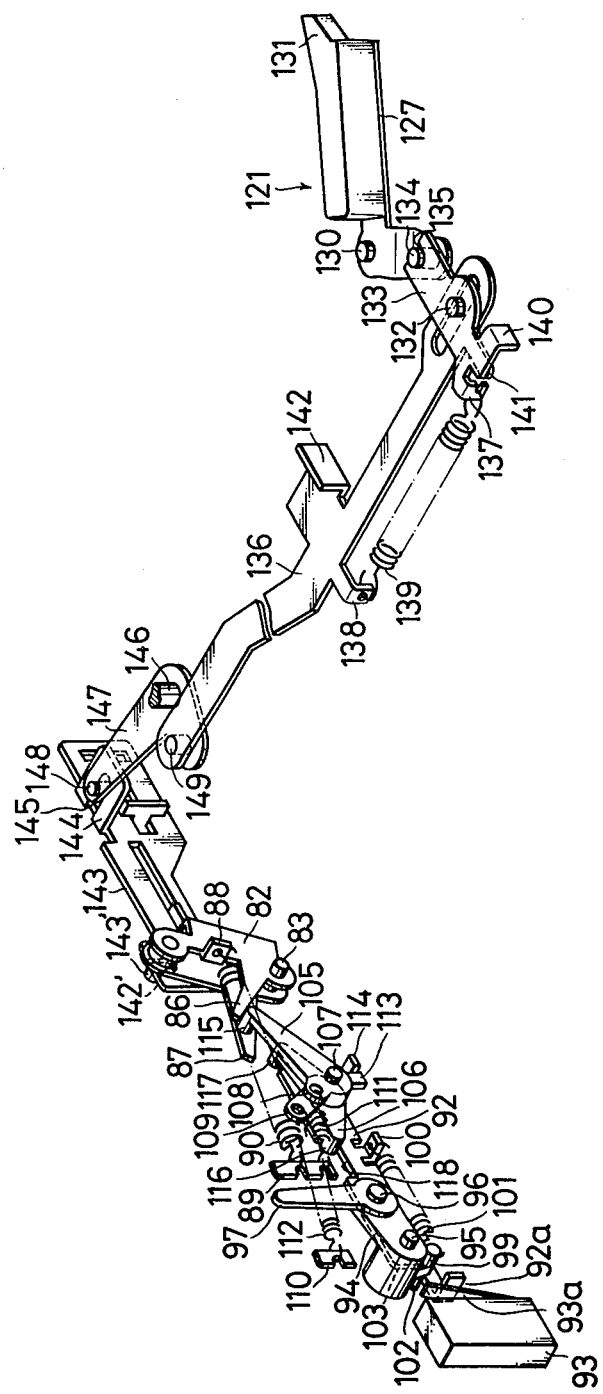
FIG. 10 is a perspective view showing an assembly by which the locking device for the cassette loading apparatus is coupled or interlocked with a locking device for a tape loading apparatus of the VTR.

When cassette holder 3 has been forced down to the cassette-loading position, holder locking lever 82, as shown in FIG. 2C, is pivotally moved in the direction of the arrow "f" to its locking position and roller 85 is engaged with an engaging or keeper portion 11a of locking piece 11 which is inserted downwardly through opening 84 in chassis 25, whereby cassette holder 3 is locked in the cassette-loading position. More particularly, and as shown in FIG. 9A, until cassette holder 3 reaches the cassette-loading position, the projection 86 of holder locking lever 82 abuts against pin 115 on control lever 105 and holder locking lever 82 is thereby held in its non-locking or released position. Just before cassette holder 3 reaches the cassette-loading position, the lower end of locking piece 11 acts downwardly against pin 115 of control lever 105 so that the latter is pivoted in the direction of arrow i' on FIG. 9B against the tension of spring 111, whereupon holder locking lever 82 is free to be pivoted in the direction of the arrow "f" in FIG. 9B by means of the tension of spring 90.

Then, as shown on FIG. 9C, at the instant cassette holder 3 reaches the cassette-loading position, holder locking lever 82 is pivoted to its locking position and its roller 85 is engaged with engaging or keeper portion 11a whereby cassette holder 3 is locked in the cassette-loading position.

In the course of the above operation, as shown in FIG. 9B, at the instant holder locking lever 82 is pivoted in the direction of the arrow "f" by spring 90, its projection 87 is brought into abutment with pin 117 on locking lever 106. Further, as shown in FIG. 9C, at the instant holder locking lever 82 is pivoted to its locking position, projection 87 thereon causes locking lever 106 to be pivoted in the direction of arrow i' in FIG. 9C against the tension of spring 112, thus allowing pin 116 on locking lever 106 to emerge upwardly from locking recess 118 of switch operating slider 92 so that the latter is unlocked.

On the other hand, and as also shown in FIG. 9C, when cassette holder 3 arrives at its cassette-loading position with a cassette 1 in holder 3, cassette sensing member 97 is pushed downward by the lower surface of cassette 1. As a result, cassette loading detection lever 94 is pivoted in the direction of arrow g' in FIG. 9C to increase the tension of spring 101 and switch operating slider 92 is moved in the direction of arrow h' by the tension of spring 101 as pin 102 on lever 94 moves away from shoulder 103. Accordingly, actuator 93a of cassette loading detection switch 93 is pushed by tip end 92a of switch operating slider 92, thus causing switch 93 to be turned ON, whereby, completion of the loading of cassette 1 is detected.

When holder locking lever 82 is pivoted to its locking position, interlocking slider 143 is moved in the direction of arrow "o" on FIG. 9C by the engagement of shaft 143' of roller 85 against shoulder 142' on slider 143. As a result of the foregoing, change lever 147 is pivoted in the direction of arrow "p" on FIG. 11 and detection slider 136 is longitudinally displaced in the direction of arrow "q". Such movement of slider 136 causes projection 140 of change lever 133 to be pushed by projection 141 of detection slider 136, so that change lever 133 is pivoted in the direction of arrow l' on FIG. 11 and ring locking lever 127 is pivoted in the direction of arrow m' to its released position indicated in phantom lines on FIG. 11, whereby tape loading ring 122 is unlocked.

When cassette holder 3 is located in the cassette-loading position, cassette 1 therein is securely urged elastically onto cassette positioning pins 64a and 64b, and is thereby accurately positioned. More particularly, so long as cassette holder 3 is raised in the cassette-receiving position, as shown in FIG. 6A, lower holder member 5 is urged down with respect to upper holder member 4 by cassette pressing levers 59a and 59b, until lower end faces 18a', 18b' and 20a', 20b' of the pairs of bent tabs 18a, 18b and 20a, 20b on lower holder member 5 are urged against the lower end faces 9a', 9b' and 10a', 10b' of the pairs of notches 9a and 9b and slits 10a and 10b in upper holder member 4. However, as shown in FIG. 6B, when cassette holder 3 is depressed to the cassette-loading position and is there locked in the foregoing manner, cassette 1 therein is brought into abutment with cassette positioning pins 64a and 64b on chassis 25, and, at this time, lower holder member 5 is raised or lifted by a distance $l_1$ relative to upper holder member 4. Such relative lifting of lower holder member 5 in respect to upper holder member 4 results from the fact that cassette 1 engages positioning pins 64a and 64b before the completion of the downward movement of holder member 4 to its locked condition. Therefore, during the final downward movement of member 4, the cassette 1 on pins 64a and 64b is stationary and, by reason of its engagement with guides 15a and 15b, holder member 5 is also stationary so as to be lifted relative to the downwardly moving holder member 4. With such lifting of lower holder member 5, cassette pressing levers 59a and 59b are pivoted in the direction of arrow d' in FIG. 6B to increase the tension of springs 63a and 63b and by virtue of the reaction forces thereof, cassette 1 is relatively strongly urged elastically onto cassette positioning pins 64a and 64b through the cassette insertion guides 15a and 15b and is stably positioned thereby.

Referring again to FIG. 6A, it will be seen that while cassette holder 3 is raised or in the cassette-inserting position, guide roller 32b is positioned at the rear end portion of the guide groove 33b, as shown in solid lines, and cassette detecting lever 54 is pivoted to the position indicated in solid lines by torsion spring 56. In this state, the tip end 54a of cassette detecting lever 54 is raised to a position which is higher by a distance $l_2$ than the adjacent cassette insertion guide 15b, so tip end 54a does not obstruct the insertion of cassette 1 into cassette holder 3. Further, in this state, the end face 54c of cassette detecting lever 54 faces, but is spaced from, guide roller 32b.

Then, as previously noted, when cassette holder 3 is forced down to the cassette-loading position after insertion of cassette 1 into holder 3, guide roller 32b moves along guide groove 33b in the direction of arrow "r" in FIG. 6A, and, when cassette holder 3 has attained the cassette-loading position, guide roller 32b is moved to the front end portion of guide groove 33b, as shown in solid lines on FIG. 6B. In the course of such movement, just after the commencement of the depressing of cassette holder 3, guide roller 32b abuts end face 54c of cassette detecting lever 54, as shown in phantom lines on FIG. 6A, and, by reason of the inclination of end face 54c, cassette detecting lever 54 is pivoted in the direction of arrow c' on FIGS. 6A and 7 against the force of torsion spring 56 and roller 32b rides under end portion 54b of detecting lever 54 for retaining the latter in the position shown in full lines on FIG. 6B.

If cassette 1 is correctly inserted in cassette holder 3 with its front end portion abutting against cassette stopper 16, as indicated in solid lines in FIG. 6A, tip end 54a of cassette detecting lever 54 will not be interfered with by cassette 1 when lever 54 pivots to the position shown by solid lines in FIG. 6B.

However, if the front end of the cassette 1, as inserted in the cassette holder 3, does not abut cassette stopper 16, for example, as shown in phantom lines in FIG. 6A, when guide roller 32b abuts end face 54c of cassette detecting lever 54 just after commencement of the depression of cassette holder 3 and cassette detecting lever 54 is slightly pivoted in the direction of arrow c' against the force of torsion spring 56 to the position indicated with phantom lines in FIG. 6A, tip end 54a abuts the upper surface of the inadequately inserted cassette 1. As a result, cassette detecting lever 54 is prevented from further pivoting in the direction of the arrow c', and its end face 54c prevents further movement of guide roller 32b in the direction of arrow "r" along guide groove 33b. Once the movement of guide roller 32b in the direction of arrow "r" is blocked, the pivotal movement of lever 28b in the direction of arrow a' in FIG. 3A is prevented, so that it is impossible to depress cassette holder 3 to its cassette-loading position.

In summary, in case a cassette 1 is inadequately inserted into cassette holder 3, cassette detecting lever 54 functions to prohibit depressing of cassette holder 3 to the cassette-loading position, that is, holder 3 can be moved to its cassette-loading position only if the contained cassette is properly inserted.

Figure 3B:
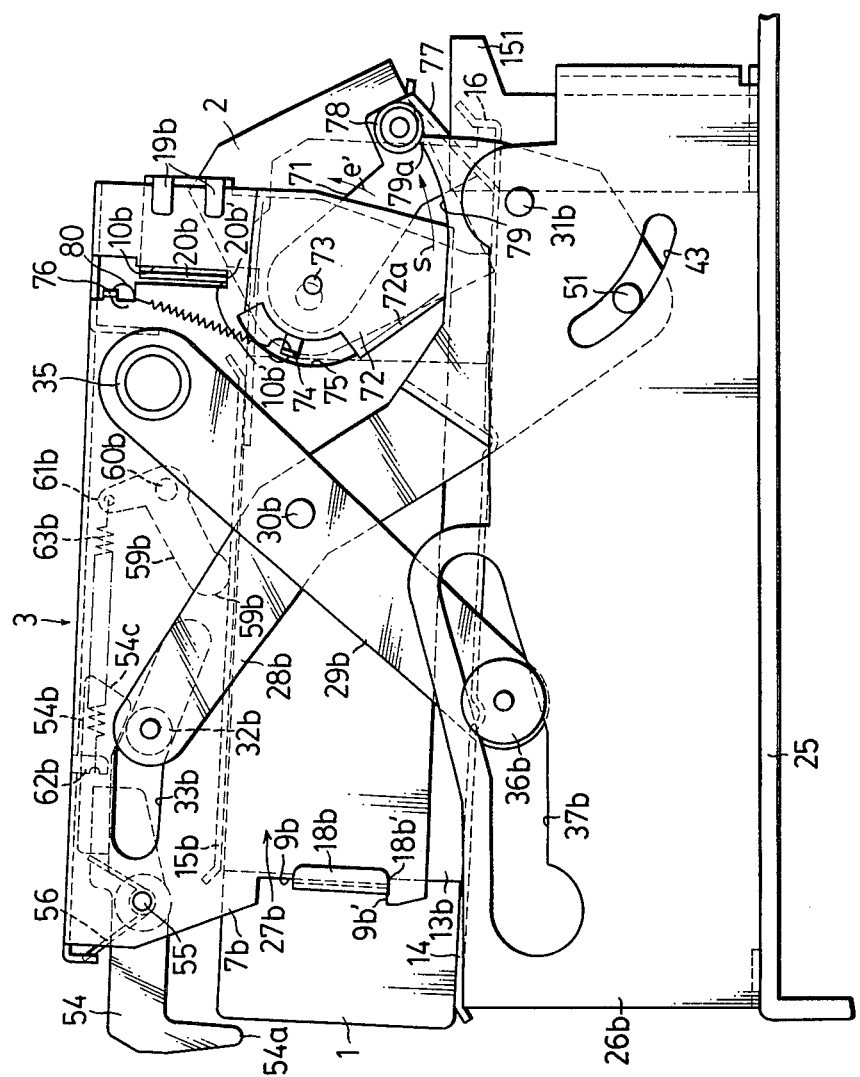
Figure 4:
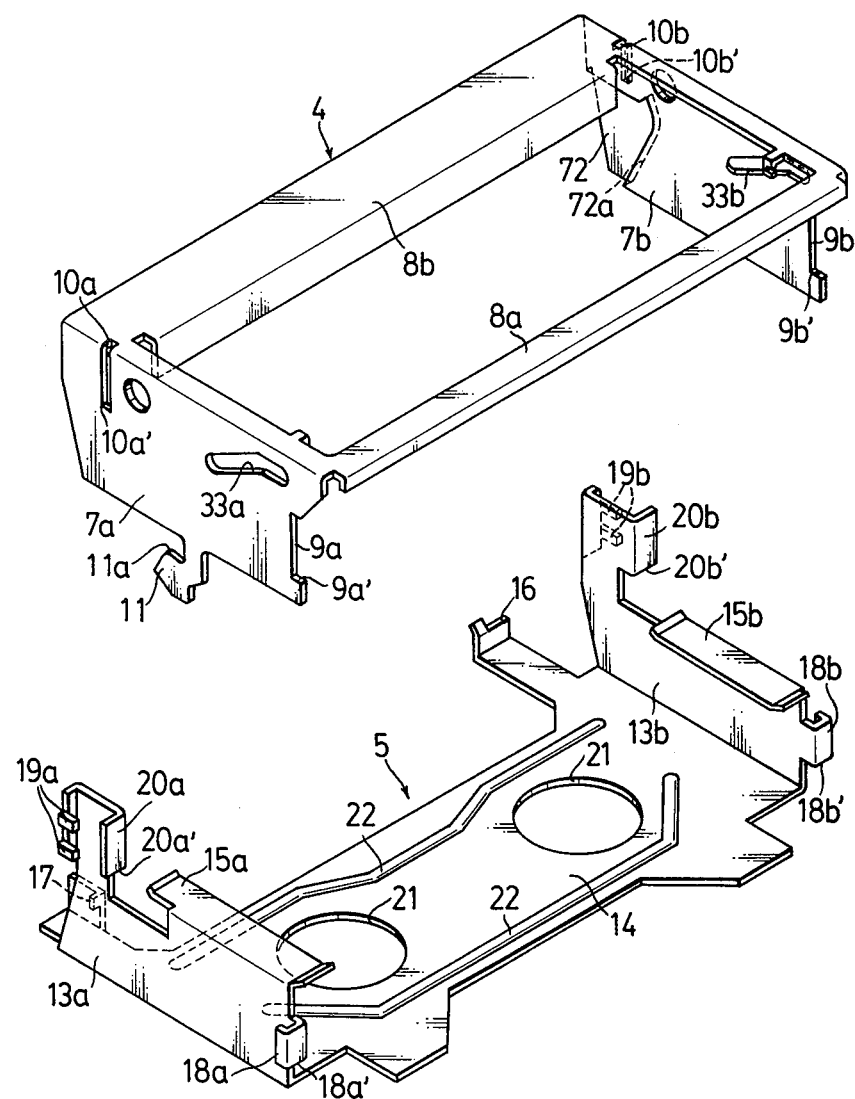
FIG. 4 is an exploded perspective view of upper and lower holder members included in the cassette holder of the loading apparatus.
Figure 8B:
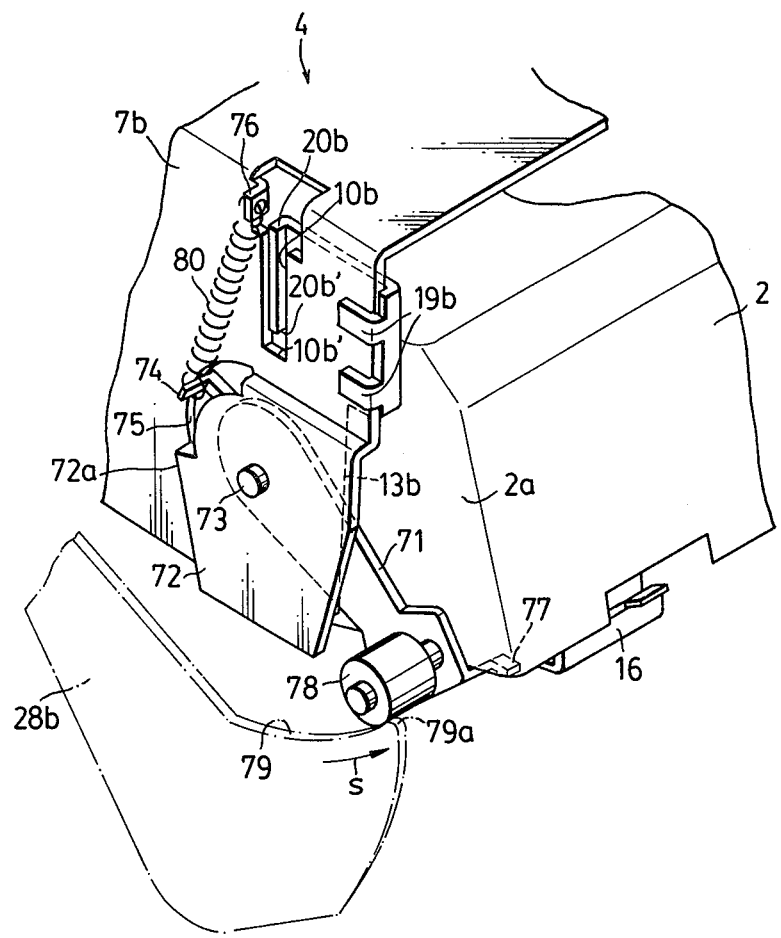
Figure 8C:
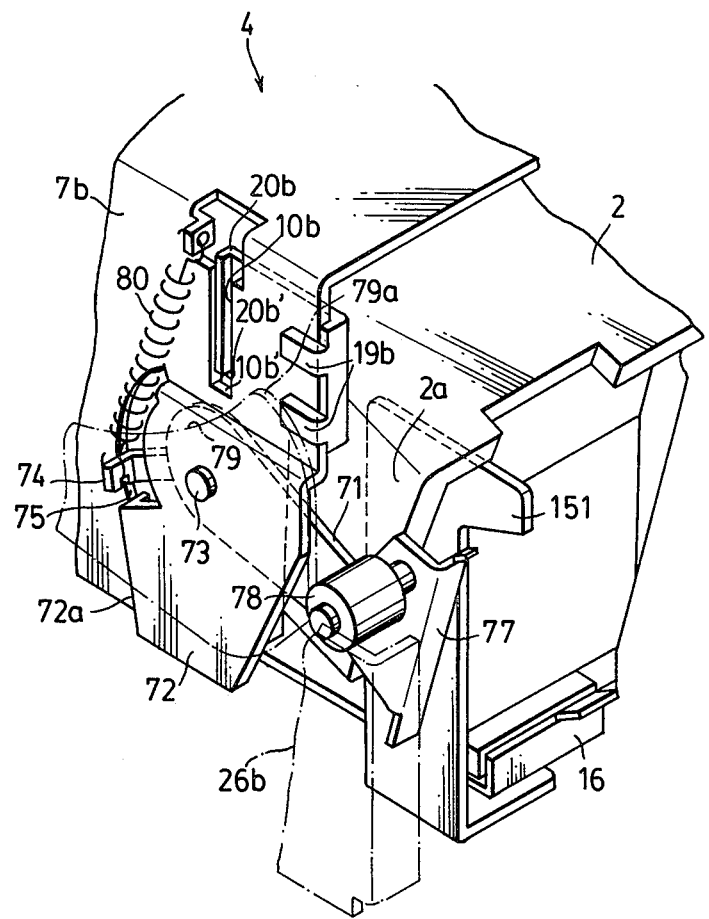

Next, as shown in FIGS. 3A to 3C and 8A to 8C, during depressing of cassette holder 3 from the cassette-receiving position to the cassette-loading position, lid or cover 2 of cassette 1 is opened quickly by cover opening lever 71. More particularly, as shown in FIG. 8A, when cassette 1 inserted in cassette holder 3 abuts cassette stopper 16, the lower surface of one end portion 2a of lid or cover 2 extends over flange 77 of cover opening lever 71. Thereafter, when cassette holder 3 is depressed and lever 28b is pivoted in the direction of arrow a' on FIG. 3A about pivot pin 31b, as is shown in FIGS. 3B and 8B, roller 78 on cover opening lever 71 is moved in the direction of arrow "s" in FIGS. 3B and 8B along roller guide face 79 of pivotable lever 28b, so that cover opening lever 71 is pivoted in the direction of arrow e' against the tension of spring 80. Roller guide face 79 is in the form of an upwardly curved, generally arcuate surface so that, upon depression of cassette holder 3, pivot pin 73 of cover opening lever 71 on holder member 4 approaches roller guide face 79, while the end portion 79a of roller guide face 79 moves upward in response to turning of lever 28b about pivot pin 31b and approaches pivot pin 73. Thus, pivot pin 73 and end portion 79a of roller guide face 79 move in opposite directions to approach each other simultaneously and, as a result, cover opening lever 71 is pivoted in the direction of arrow e' on FIG. 3B at a substantially higher speed than the depressing speed of cassette holder 3.

When cover opening lever 71 is pivoted in the direction of arrow e' on FIG. 3B, lid or cover 2 of cassette 1 is pushed up by flange 77 and is thereby quickly opened automatically. Thus, while cassette holder 3 is being depressed only a relatively small distance from the cassette-inserting position shown in FIG. 3A to the position shown in FIG. 3B, the lid or cover 2 of cassette 1 is quickly opened to a substantial extent.

When cassette holder 3 has been pushed down to the position shown in FIG. 3B, the opening of cover 2 by cover opening lever 71 is completed, and thereafter roller 78 rides off, and is disengaged downward from end portion 79a of roller guide face 79. At such time, cover 2 is positioned close to the upper end edge of a cover opening plate 151 which is fixed in an erect position on one side portion of chassis 25. Then, while cassette holder 3 is further depressed from the position shown in FIG. 3B to the cassette-loading position shown in FIG. 3C, the lower end of cover 2 engages the upper end edge of cover opening plate 151 and is pushed up relative to the remainder of cassette 1. As a result, when holder 3 reaches the cassette-loading position, cover 2 is completely opened, thus permitting the tape to be drawn out of the cassette 1.

The cassette loading operation is now completed and, in response to the consequent turning ON of cassette loading detection switch 93, operation of tape loading apparatus 121 may be automatically initiated, so that tape loading ring 122 and tape loading slider 123 are moved in the directions of arrow "j" and "k", respectively, in FIG. 11, whereby the already known automatic tape loading operation is performed. Such movement of the tape loading slider 123 in the direction of arrow "k" starts from its returned position indicated in phantom lines in FIG. 11.

If an eject button (not shown) is pushed after a desired recording or reproducing operation, a tape unloading operation is performed, again in a known manner, by the tape loading apparatus 121, and, in this case, tape loading ring 122 is moved back in the direction of arrow j' in FIG. 11 and is stopped in its returned position shown in solid lines, while tape loading slider 123 is first moved back in the direction of arrow k' until it reaches the position shown in solid lines, and then is returned in the direction of arrow "k" up to its returned position shown in phantom lines and where it is stopped.

At the end of such tape unloading operation, the tip end of tape loading slider 123 abuts detecting projection 142 on detection slider 136 and causes the latter to slide in the direction of arrow q'. As a result thereof, change lever 147 is pivoted in the direction of arrow p' and interlocking slider 143 is moved in the direction of arrow o' on FIG. 9C, whereby holder locking lever 82 is pivoted in the direction of arrow f' against the tension of spring 90 to its released or non-locking position shown in phantom lines on FIG. 9C. Upon such unlocking of cassette holder 3, and by virtue of the spring force of tension spring 41 the steps involved in the foregoing cassette loading operation are made to occur in a reverse sequence so that the cassette holder 3 is raised from the cassette-loading position and returned to the cassette-inserting position shown in FIGS. 2A and 3A.

The instant cassette holder 3 is raised from the cassette-loading position, cassette loading detecting lever 94 is pivoted in the direction of arrow "g" in FIG. 9C by the tension of spring 101 for return to the state of FIG. 9A. At the same time, switch operating slider 92 is moved in the direction of arrow "h" in FIG. 9C for return to the position on FIG. 9A, so that cassette loading detection switch 93 is again turned OFF. At the same time, control lever 105 and locking lever 106 are both pivoted in the direction of arrow "i" in FIG. 9C and are returned to the positions shown on FIG. 9A, so that pin 116 on locking lever 106 engages in locking recess 118 of switch operating slider 92 for again locking slider 92 in the position shown in FIG. 9A, while pin 115 on control lever 105 abuts against the projection 86 of holder locking lever 82 for holding the latter in the non-locking position shown on FIG. 9A.

As a result of the movement of detection slider 136 in the direction of arrow q' from the position indicated in phantom lines in FIG. 11 to the position there indicated in solid lines, change lever 133 is pivoted in the direction of arrow "l" by the tension of spring 139, and ring locking lever 127 is pivoted in the direction of arrow "m" for engaging its locking pawl 131 in locking recess 126 of tape loading ring 122, thereby again locking ring 122 in its returned position Although the above described embodiment of the invention involves a cassette loading apparatus in which the movement of cassette holder 3 from its cassette-receiving position to its cassette-loading position is effected manually, it will be appreciated that the invention may be similarly applied to a cassette loading apparatus in which movement of the cassette holder from its cassette-receiving position to its cassette-loading position is effected by a suitable motor-driven mechanism. Further, the invention has been specifically described herein in its application to a VTR, but it will be appreciated that the invention can be similarly applied to cassette loading apparatus for other types of tape recorders or other electronic devices employing cassettes.

Moreover, having specifically described an embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In an apparatus for recording and/or reproducing signals on a tape wound on reel means in a housing of a cassette when the cassette is in an operative position determined by engagement of the cassette housing with locating means on a chassis of the recording and/or reproducing apparatus: a cassette loading apparatus comprising cassette holding means; mounting means supporting said holding means for movements relative to said chassis between a cassette-receiving position remote from said chassis and in which a cassette can be inserted in, and removed from said holding means, and a cassette-loading position in which a cassette in a correct position in said holding means engages said locating means and is disposed by the latter in said operative position, said mounting means including an element constrained to move in a prescribed path upon said movement of the holding means from said cassette-receiving position to said cassette-loading position; and a detecting lever pivoted on said holding means and having one end portion with an inclined edge which, in a first angular position of said detecting lever, is engageable by said moveable element of the mounting means upon movement of said element in said prescribed path for angularly displacing said detecting lever to a second angular position permitting further movement of said movable element along said path, and a sensing portion on said detecting lever which is free to move with the latter from said first angular position to said second angular position when said cassette is in said correct position in respect to said holding means and which is blocked by said cassette to prevent movement of said detecting lever from said first angular position to said second angular position upon deviation of said cassette from said correct position and thereby preventing movement of said holding means to said cassette-loading position.

2. An apparatus according to claim 1; in which said holding means has a front opening through which the cassette is insertable and removable with said holding means in said cassette-receiving position, and stop means at a rear portion of said holding means and against which a cassette abuts in said correct position so that a cassette which deviates from said correct position extends more than a predetermined distance from said front opening; and in which said sensing portion of the detecting lever is withdrawn from said front opening of the holding means in said first angular position of the detecting lever and is extended across said front opening at said predetermined distance from the latter in said second angular position of the detecting lever.

3. An apparatus according to claim 2; in which said mounting means includes support levers at opposite sides of said holding means which are pivotally connected to said chassis at one ends of said support levers, said opposite sides of said holding means having elongated guide means therein, and guide followers on the other ends of said support levers and being movable along said guide means at the respective sides of said holding means in the course of said movements of the holding means between said cassette-receiving and cassette-loading positions; and in which one of said guide follower constitutes said movable element engageable with said inclined edge of the detecting lever for angularly displacing the latter from said first to said second angular position.

4. An apparatus according to claim 3; in which said one end portion of the detecting lever extends generally along the one of said guide means associated with said one guide follower so that, upon substantial movement of said holding means away from said cassette-receiving position, said one guide follower is positioned along said associated guide means to be engageable by said one end portion of the detecting lever for maintaining the latter in said second angular position where said sensing portion prevents substantial removal of the cassette from said predetermined position relative to the holding means.

5. An apparatus according to claim 4; in which said mounting means further includes second support levers at said opposite sides of the holding means, one ends of said second support levers are pivotally connected to the respective sides of said holding means, the other ends of said second support levers have guide followers thereon movable along respective guide means on said chassis, and said second support levers and the first mentioned support levers at the corresponding sides of said holding means are pivotally connected with each other intermediate their ends.

6. An apparatus according to claim 1; further comprising locking means for releasably locking said holding means in said cassette-loading position.

7. An apparatus according to claim 6; further comprising spring means for urging said holding means to return to said cassette-receiving position upon release of said locking means.

8. An apparatus according to claim 7; further comprising tape loading means operative to withdraw tape from the housing of a cassette in said operative position for the recording or reproducing of signals on the withdrawn tape, and interlock means permitting operation of said tape loading means only when said locking means locks said holding means in said cassette-loading position.

9. An apparatus according to claim 8; further comprising means sensing the presence in said operative position of a cassette in said holding means for initiating an operation of said tape loading means.

10. In an apparatus for recording and/or reproducing signals on a tape wound on reel means in a housing of a cassette when the cassette is in an operative position determined by engagement of the cassette housing with locating means on a chassis of the recording and/or reproducing apparatus: a cassette loading apparatus comprising cassette holding means; mounting means supporting said holding means for movements relative to said chassis between a cassette-receiving position remote from said chassis and in which a cassette can be inserted in, and removed from said holding means, and a cassette-loading position in which a cassette in a correct position in said holding means engages said locating means and is disposed by the latter in said operative position, said holding means including a cassette holding member adapted to contain a cassette and a holder support member connected to said mounting means and joined with said holding member for limited relative movement therebetween in directions toward and away from said chassis;

means acting between said holder support member and said cassette holding member for urging said cassette holding member, and hence a cassette in the latter, toward said locating means on the chassis upon movement of said holding means to said cassette-loading position;

detecting means engageable with a cassette inserted in said holding means in said cassette-receiving position;

and means coupled with said detecting means for preventing movement of said holding means from said cassette-receiving position toward said cassette-loading position in the event that the cassette engaged by said detecting means deviates from said correct position in respect to said holding means.

11. An apparatus according to claim 10; in which said cassette holding member includes cassette guiding means slidably engageable by the cassette for insertion and removal of the latter; said locating means on the chassis are disposed to be engaged by a cassette in said holding means before the completion of the movement of said holding means to said cassette-loading position; and said means acting between said holder support member and said cassette holding member includes pressing lever means pivoted on said holder support member, and spring means urging said pressing lever means to bear against said cassette guiding means in the direction toward said chassis so that, in said cassette-loading position, the force of said spring means holds a cassette in contact with said locating means.

12. In an apparatus for recording and/or reproducing signals on a tape wound on reel means in a housing of a cassette when the cassette is in an operative position determined by engagement of the cassette housing with locating means on a chassis of the recording and/or reproducing apparatus, and in which the cassette has a pivoted lid movable between a normal closed position and an opened position; a cassette loading apparatus comprising cassette holding means; mounting means supporting said holding means for movements relative to said chassis between a cassette-receiving position remote from said chassis and in which a cassette can be inserted in, and removed from said holding means, and a cassette-loading position in which a cassette in a correct position in said holding means engages said locating means and is disposed by the latter in said operative position;

lid-opening means on said holding means engageable with the lid of a cassette inserted in said holding means in said cassette-receiving position; and actuating means operable in response to movement of said holding means from said cassette-receiving position toward said cassette-loading position for causing said lid-opening means to relatively rapidly move the engaged lid to said opened position of the latter during an initial portion of said movement of the holding means from said cassette-receiving position.

13. An apparatus according to claim 12; in which said lid-opening means includes a lid-opening lever pivoted on said holding means and biased to an initial position in which a flange on said lid-opening lever engages said lid of the inserted cassette; and said actuating means includes a cam follower on said lid-opening lever and cam means engaged by said cam follower in said initial position of the lid-opening lever to angularly displace the latter from said initial position for pivoting the engaged lid toward its opened position in response to said movement of said holding means from said cassette-receiving position.

14. An apparatus according to claim 13; in which said cam means is disposed on said mounting means to provide relatively large angular displacements of said lid from its closed position upon said initial portion of the movement of said holding means from said cassette-receiving position.

* * * * *